Figure 1:
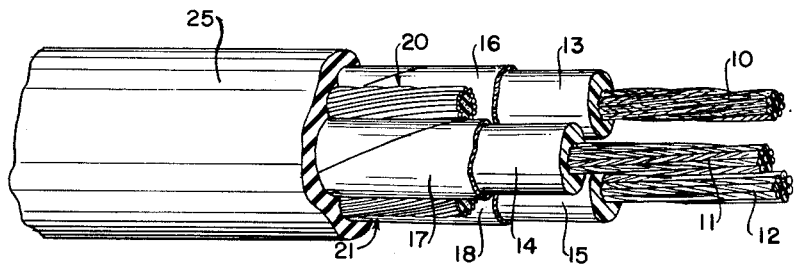

April 25, 1961  S. BUNISH  2,981,788
POWER CABLES
Filed Dec. 3, 1958

INVENTOR.
STEPHEN BUNISH
BY
*Pennie, Edmonds, Morton, Barrows & Taylor*
ATTORNEYS

United States Patent Office 2,981,788
Patented Apr. 25, 1961

2,981,788

POWER CABLES

Stephen Bunish, Marion, Ind., assignor to Anaconda Wire and Cable Company, a corporation of Delaware Filed Dec. 3, 1958, Ser. No. 778,010

2 Claims. (Cl. 174—115)

This invention relates to grounding conductors for flexible electric power cables, and more particularly to flexible grounding conductors in which a plurality of metallic strands are helically wrapped about a tough pliable core of elastomeric polymer, or the like. In accordance with the present invention the core is modified so as to be sufficiently conductive to permit current to flow through the core even though most or all of the strands are displaced or severed, thus greatly enhancing the safety factor.

Grounding conductors are included in power cables, especially high tension cables, as a protection against shortcircuit currents. They also assist in preventing corona effects by neutralizing static charges which tend to accumulate on the insulation of the conductors of such cables.

Power cables such as those commonly employed to furnish electric power to mobile mine machinery, and the like, are often subjected to extremely severe operating conditions and abuse, by reason of which the cables can become damaged to an extent which produces high leakage current to ground, or even a shortcircuit to ground. In enclosed areas which are likely to be wet and may involve explosive materials, such currents from high tension cables have been known to cause serious accidents including fires, explosions and electrocution of personnel. The likelihood of such accidents is increased by the operating conditions encountered in mines where physical damage to flexible cables is caused by abrasion, excessive tension applied to the cable while bent, and by crushing under falling rock or when run over by heavy machinery.

To withstand such severe treatment, power cables have been provided with thick, tough insulation usually of dense rubber compounds applied so as to minimize voids in order to resist crushing forces. In addition, a grounding conductor has been included in the cable so that if the cable insulation is damaged, one or more of the power-carrying conductors is likely to come into contact with the grounding conductor and cause a sudden increase in current flowing through this conductor. If, then, an overload current relay or circuit breaker, is included in a circuit between the grounding conductor and the return leg of the power source at a remote point, as at a junction box where the cable is attached to the power line and, if the grounding conductor remains intact, the relay will be actuated by the grounding-conductor current, and may be arranged to automatically disconnect the damaged portion of the cable from the power line. It has been found in practice that the severe operating conditions to which such cables are subject sometimes damage the grounding conductor as well as the insulation of one or more of the main conductors. If this damage produces extreme dislocation of the conducting strands or severance thereof, the safety function of the grounding conductor will cease.

To provide a more dependable electric power cable of the nature specified and to increase the safety factor thereof, the cable of the present invention includes within its structure a grounding conductor which will continue its intended function even though the conducting strands surrounding its flexible core be severely damaged or severed completely. This grounding conductor comprises a tough, pliable extended core of an elastomeric polymer having a plurality of metallic elements, usually copper wires, helically wrapped about the core to form a substantially continuous conductive covering over the core. The conductive covering is in electrically conductive connection with the external layer of insulation on the main conductor of the power cable. The elastomeric polymer of the core contains, according to the invention, electrically conductive constituent particles uniformly dispersed throughout its structure in quantities sufficient to impart considerable conductivity to the core itself, but without appreciably impairing the other desirable properties, especially flexibility, elasticity and the ability to resist considerable compressive force.

Figure 2:
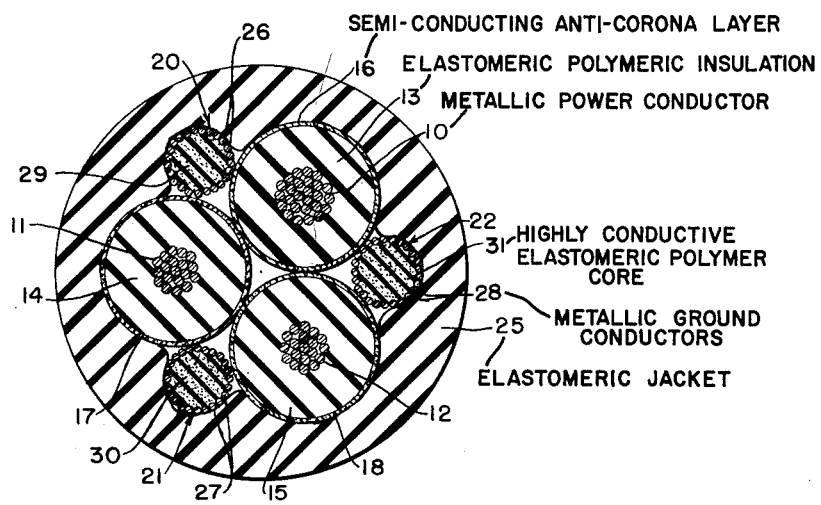

A typical embodiment of a cable employing a grounding conductor in accordance with the invention is described below and is illustrated in the accompanying drawing wherein:

Fig. 1 is an isometric view, partially broken away, showing the various elements of a three-conductor cable employing grounding conductors in accordance with the invention; and Fig. 2 is an enlarged view in cross-section of the cable of Fig. 1.

Referring to the drawing, three coextensive conductors 10, 11 and 12, which may be solid but advantageously are stranded, are each covered with rubber, or rubber-like insulations 13, 14 and 15, respectively. Over the layers of insulation thin layers 16, 17 and 18, respectively, of semi-conductive coatings are concentrically applied. The purpose of such semi-conductive layers is, as is known in the art, to minimize brush discharge or corona effects, especially in high-potential cables, due to the so-called charging current of the insulation. If this anti-corona, semi-conducting layer is grounded, the mentioned charging current leaks off without impairing the insulating quality of the cable insulation per se.

Three grounding conductors 20, 21 and 22 of the type contemplated by this invention are combined with the insulated cable or power conductors, so that the grounding conductors lie in the three valleys defined by the insulated power conductors as shown. Thus the grounding conductors are in continuous contact with the semi-conductive coatings of the two adjacent cable conductors. The six cable elements above referred to are surrounded in conventional manner by a jacket 25 of neoprene, or other tough insulating material to provide an overall insulating cover layer or jacket for the entire cable. If desired, this jacketing layer may include reinforcing material.

Each of the grounding conductors 20, 21 and 22 is constructed of a plurality of copper strands or wires 26, 27, 28, helically wrapped about a cylindrical core 29, 30, 31 of neoprene, or other suitable elastomeric polymer, in such manner that the adjacent strands of each conductor are in electrical connection with each other and provide a continuous flexible conductive covering about the surface of the core. In the cable assembly the copper strands of each grounding conductor rest on and are in contact with the adjacent semi-conductive layers of two of the power conductors and, because they, as well as the grounding conductor and power cable assemblies, are twisted, all of these strands make recurring contact with the mentioned semi-conducting surface layers. For example, the copper strands 26 of grounding conductor 20 are in direct electrical contact at recurring points with most of the areas of semi-conductive layers 16 and 17 which cover the insulation layers 13 and 14 of the power conductors 10 and 11, respectively.

According to the invention, each of the cores 29, 30, 31 comprises a semi-conducting rubber-like compound such as neoprene, heavily loaded with conducting carbon black, for example 30%–50% carbon black by weight calculated on the rubber. A conducting compound suitable for the cores 20, 21, 22 of the grounding conductors is described at the end of this specification, but it is to be understood that this is given only by way of example, because other compounds having comparable characteristics can be substituted. To achieve the desired degree of uniformity of conductivity of the core material it is important that dispersion of the conductive particles throughout the matrix compound be as uniform as possible.

Since it is the purpose of cores 20, 21, 22 to be sufficiently conductive to supplement and possibly replace the conductivity of the superimposed copper strands which they carry, the electrical characteristics of this core material are different from those of the semi-conductive coatings 16, 17 and 18. As those skilled in the art are well aware, the anti-corona effect of an external semi-conductive layer is optimum when the conductivity thereof is rather low. On the other hand, the conductivity of the core material of the grounding conductor can hardly be too high. However, this conductor assembly cannot satisfactorily be formed exclusively of high conducting material such as copper, because its physical characteristics should at least approximate those of the insulated power conductor assemblies which are adjacent it. This is achieved by forming both assemblies of comparable materials, viz., neoprene and copper strands.

As long as the grounding conductors are connected to ground at a terminal point they will, of course, carry off electric charges induced on the exterior of the insulation of the cable conductors because they are, as above explained, in continuous contact with the semi-conducting coating layers. Although this function is important in preserving the cable insulation and thus prolonging the active life of the cable, the more important function of the grounding conductor is to protect the cable and its environment against the effects of dangerous short-circuits resulting from cable damage. For this purpose the grounding conductor is connected at a terminal point to the actuating coil of a protective relay (not illustrated) which operates to disconnect the power cable from the power source when the current flowing in the grounding conductor in a return circuit to the power source exceeds a predetermined value. Such value will be exceeded if and when the cable is damaged to such extent that the insulation of at least one of the power-carrying conductors is broken or punctured. In this event the leakage or shortcircuit current from this power conductor to the grounding conductor will greatly increase the current flowing in the latter, and this current will be sufficient to actuate the mentioned protective relay. If, as above pointed out, the damage to the cable also damages the grounding conductor, even to the point of severing the external conducting strands thereof, the core of the grounding conductor will itself constitute a conductor of sufficient conductivity to bridge the damaged section and in most cases will conduct sufficient current to actuate the relay. Although such protective relay is usually arranged to disconnect the damaged section of the cable from the power line, it may, of course, have any other desirable function, such as to actuate a signalling circuit; or it may have both functions.

The foregoing description of one practical embodiment of the invention relates to a three-conductor cable with three grounding conductors, all in contact with the semi-conducting anti-corona layers around the respective conductor insulation. However, the invention is not limited to this specific type of cable since it is equally applicable to various other specific types of cable construction. For example, the cable may comprise two or more insulated conductors. In the case of two insulated conductors, it is preferable to locate the grounding conductor symmetrically between the two insulated conductors. In certain forms of cables in accordance with the invention each insulated power conductor carries a braided copper sheath between the cable insulation and the jacket, with the grounding conductors in the valleys of the sheaths. Alternatively, a braided copper sheath may be applied around all of the insulated conductors and grounding conductors before the external jacket is applied. In any of the cables herein referred to, a semi-conducting anti-corona layer on the insulation of each conductor or surrounding all of the conductors may be included or omitted, as the nature of the use may require.

To enable those skilled in the art to practice the invention, a conducting compound suitable for the cores of the grounding conductors in accordance with the invention is described below. This compound, when vulcanized according to practice well known in the art, has physical properties substantially the same as those of the power conductor insulation. However, it has in addition the desired degree of electrical conductivity as required to achieve the object of the invention.

*Conducting compound*

| | Percent (by weight) |
|---|---|
| Neoprene GN | 41.57 |
| Aranox | 1.0 |
| Altax | 0.5 |
| Neozone D | 1.0 |
| Stearic acid | 2.0 |
| Vulcan SC | 34.75 |
| Circo oil | 4.0 |
| Zinc oxide | 2.0 |
| Sundex 53 | 11.5 |
| Magalite M | 1.5 |

Except for the stearic acid and zinc oxide, the above ingredients are designated by trade names which may be identified as follows:

Neoprene GN—a poly[2-chloro-1,3-butadiene] containing an antioxidant
Aranox—p-(p-tolylsulfonylamido)-diphenylamine (rubber antioxidant)
Altax—benzothiazyl disulfide (rubber accelerator)
Neozone D—phenyl-$\beta$-naphthylamine (antioxidant)
Vulcan SC—carbon black (a conducting form of 21 millimicrons particle size)
Circo oil—a light, processed hydrocarbon oil used as a softener and processing aid
Sundex 53—hydrocarbon oil:
    Sp. gr.=0.9792
    Viscosity=85 SUS at 210° F.
    Aniline point=115° F.
    Aromatics=75% by weight
Magalite M:
    Silica, .26%
    Iron oxide, .03%
    Aluminum oxide, .10%
    Calcium oxide, 1.66%
    Chorides (NaCl), .52%
    Sulfates ($SO_3$), .46%
    Magnesium oxide, 96.97%

I claim:
1. In a high-voltage electric power cable including a plurality of flexible power conductors, a layer of elastomeric polymer insulating material covering each conductor, a separate thin anti-corona layer of semi-conducting material covering and surrounding each insulating layer, a flexible grounding conductor comprising an extended core of tough pliable polymeric material having flexibility and elasticity substantially the same as those of said elastomeric polymer, and a plurality of metal strands helically wrapped about said core to form a substantially continuous conductive covering over the surface of the core, said covering being in substantially continuous electrical contact with the semi-conducting layers of an adjacent pair of said insulated power conductors and being adjacent and symmetrically disposed with respect to the insulating material on said pair of conductors and thereby adapted to contact either of said power conductors when the insulating material thereon is damaged, said core material containing conducting carbon black of substantially 21 millimicrons particle size and in an amount of approximately 30% to 50% by weight of the core material uniformly dispersed therein so as to provide a conducting path of conductivity much greater than that of said semi-conductive layer effective to electrically shunt a locally damaged longitudinal section of said strands, thereby to maintain the current-carrying continuity of said grounding conductor, and a jacket surrounding and binding said covered conductors together.

2. A high-voltage electric power cable according to claim 1 in which said insulation comprises neoprene, said jacket comprises neoprene which also fills the valleys between conductors, and said core material comprises neoprene compond.

References Cited in the file of this patent

UNITED STATES PATENTS

| | | |
|---|---|---|
| 2,172,760 | Rosch | Sept. 12, 1939 |
| 2,446,387 | Peterson | Aug. 3, 1948 |

FOREIGN PATENTS

| | | |
|---|---|---|
| 641,922 | Great Britain | Aug. 23, 1950 |
| 647,753 | Great Britain | Dec. 20, 1950 |

OTHER REFERENCES

Rubber Chemistry, vol. 15, 1942, pages 146–157.